3,420,875
OLEFIN SULFONATES
Walter Anthony Di Salvo, North Arlington, and Jerome Stanley Schrager, Cedar Grove, N.J., assignors to Colgate-Palmolive Company, New York, N.Y., a corporation of Delaware
No Drawing. Filed Aug. 2, 1966, Ser. No. 569,565
U.S. Cl. 260—513                    7 Claims
Int. Cl. C07c *139/06;* C07c *143/02*

This invention relates to the production of olefin sulfonate detergents.

Olefin sulfonate detergents have been made by the reaction of olefins (preferably alpha-olefins) with highly diluted gaseous $SO_3$ (either in a single stage or a plurality of stages, and using for example 0.9 to 1.4 moles of $SO_3$ per mole of olefin) to produce an acidic mixture ("acid mix"), followed by hydrolysis of the resulting reaction product with hot aqueous sodium hydroxide. It is believed that the acid mix contains a mixture of an alkenyl sulfonic acid and a sultone, principally gamma sultone, and the base hydrolysis treatment causes ring-opening of this sultone to produce a hydroxyalkane sulfonate. In an improved process, described in the copending application of Rubinfeld and Ouw, Ser. No. 548,827, filed May 10, 1966, the acid mix previously described is treated with strong sulfuric acid and the chemically changed acid mix thus produced (hereafter termed "Stage II acid mix") is then treated with aqueous base; this results in a greater yield of olefin sulfonate detergent, and a higher ratio of alkenylsulfonate to hydroxyalkane sulfonate. The Stage II acid mix generally also contains long chain sultone and alkenylsulfonic acid, but the sultone is primarily delta sultone.

The olefin sulfonates may also contain minor quantities of disulfonates, presumably produced in the course of the sulfonation treatment by reaction of excess $SO_3$ with the alkenyl sulfonate formed during sulfonation.

In accordance with one aspect of this invention, we have developed a process for the rapid and continuous base treatment of the acid mix. The acid mix is mixed with excess sodium hydroxide and a limited amount of water, to raise the pH of the mixture to about 12 or above thus producing a highly viscous alkaline blend, which is then passed continuously into a zone which is maintained under superatmospheric pressure and in which said blend makes contact with a heated solid heat-exchange surface maintained at a temperature of at least about 350° F., so as to raise the temperature of the blend to at least about 330° F. within a period of less than 5 minutes by said contact. We have found, surprisingly, that despite the initial high viscosity of the alkaline blend, the ring-opening reaction of the sultones (to form long chain sulfonic acids) occurring during the heat treatment causes the viscosity to drop sharply and very rapidly, so that the transfer of heat from the heated solid surface to the entire mixture takes place quickly and efficiently without the need for special mechanical wall-scraping equipment. Thus, a barely pumpable alkaline slurry of dissolved alkenyl sulfonate and undissolved long chain sultones (obtained on neutralization of a Stage II acid mix), which slurry has a viscosity like that of mayonnaise (e.g., a viscosity in the range of about 10,000 to 30,000 centipoises, measured at 100° F.) can be forced through a heat-exchanger maintained at a temperature of about 350° F., emerging after a residence time of only 3 minutes or less as a readily flowing relatively concentrated mixture substantially free of sultones and having a viscosity in the range of about 500–1000 cps. (similarly measured at 100° F.).

The process is especially useful with the Stage II acid mixes produced by the sulfuric acid treatment described in the previously mentioned pending application of Rubinfeld and Ouw. Here, the solids content of the alkaline blend may be quite high, preferably above about 45% (e.g., in the range of about 50 to 55%), yielding a correspondingly concentrated olefin sulfonate detergent product. For products made without the sulfuric acid treatment, the alkaline blends at these concentrations are often practically immobile, being pumpable only with difficulty, before the heat treatment and therefore have much slower rates of heat transfer; it is therefore desirable, unless special pumps and heat transfer equipment are available, to use blends of lower solids content (e.g., in the range of about 30 to 40%).

The solids content of the product of the heat treatment can be raised by permitting water to flash off, at atmospheric pressure, as the mixture emerges from the superatmospheric pressure heat treatment zone. This also helps to cool the heated mixture more rapidly.

As previously indicated, no special complicated equipment is required for the heat treatment of the alkaline material. Good results have been obtained with a plate heat exchanger made up of a series of spaced corrugated parallel plates, arranged in pairs, with the heating medium (e.g., steam under pressure) flowing between the plates of each pair and the mixture being treated flowing between the pairs of plates, so that the mixture passes through the heat exchanger in several parallel paths in contact with the steam-heated plates. Another suitable apparatus is a shell and tube heat exchanger having a number of spaced parallel tubes passing longitudinally through an elongated enclosed vessel; the heating medium (e.g., steam under superatmospheric pressure) is preferably supplied to the interiors of the tubes while the alkaline blend travels continuously transversely to the tubes through the vessel in the spaces between the tubes; a series of baffles extending perpendicular to the tubes serves to direct the flow of the blend so that it changes direction by 180° several times during its travel through the heat exchanger and thereby makes several passes, over successive portions of the lengths of the heated tubes, before the product emerges from the discharge outlet of the vessel. The plates and tubes of these heat-exchangers are generally made of metal (e.g., mild steel or stainless steel).

In the heat exchanger the solid surfaces supplying heat to the alkaline blend preferably have temperatures within the range of about 350 to 500° F. and the blend is preferably heated by contact with these surfaces to a temperature within the range of about 330 to 480° F. in a period within the range of about ½ minute to 3 minutes.

The amount of NaOH used for making the alkaline blend should be at least about 110% of the amount stoichiometrically required for neutralizing all the acidity of the acid mix and all the acidity obtainable on complete ring opening of the sultone content of the acid mix. Preferably, the amount is in the range of about 120 to 140% of the stoichiometric amount.

The sodium hydroxide is preferably supplied as an aqueous solution (e.g., of about 15–25 or 30% concentration) so as to keep the water content of the resulting mixture as low as practicable (e.g., below 55% water).

It is desirable to keep the acid mix cool (preferably at a temperature below 120° F., e.g., 80° F.) before neutralization with the sodium hydroxide and to have the sodium hydroxide solution at a similar cool temperature before it contacts the acid mix, to decrease the likelihood of local overheating, and attendant discoloration, of portions of unneutralized acidic material during the exothermic neutralization reaction. The temperature during the neutralization should be maintained below 150° F., preferably in the range of up to about 120° F., e.g., about 90° to 120° F. A stream of the acid mix may be directly and continuously mixed with the aqueous sodium hydroxide to form a stream of alkaline blend which flows directly and continuously to the heat treatment zone. In another process, the viscous alkaline blend is allowed to stand (e.g., in a stirred vessel) from which a stream is continuously drawn off and passed to the heat treatment zone. The neutralization may be effected in a recycle loop, which may be a continuous loop of tubing having inlets through which the acid mix and the sodium hydroxide solution are fed continuously and an outlet through which the product is withdrawn continuously, the total rates of feed and withdrawal (which are substantially equal) being each only a fraction of the rate at which the mixture is passed through the loop; thus the mixture recycles many times in the loop and the composition of the withdrawn material is substantially the same as that of the recycling material in the loop.

The monoolefin feedstock to be sulfonated may contain olefins of the formula $RCH=CHR_1$, where R is an alkyl radical and $R_1$ is alkyl or hydrogen, preferably hydrogen, the olefins having, for example, 8–30 carbon atoms, preferably 12–21 carbon atoms. The feedstock may contain minor amounts of other constituents such as secondary or internal olefins, diolefins, cyclic olefins, aromatics, naphthenes and alkanes, and may be produced by cracking of petroleum wax, catalytic polymerization of ethylene, dehydration of long chain alcohols, etc. Best results have thus far been obtained when α-olefin (where $R_1$ is H) constitute a major proportion, e.g., above 70% and preferably at least 90% of the feedstock. A particularly preferred olefin feedstock contains in the range of about 12 to 21 carbon atoms in the molecule and yields alkenyl sulfonates having excellent detergency properties. Especially good foaming and detersive characteristics have been obtained by the use of a feedstock whose alpha-olefin content consists essentially of compounds of 15 to 18 carbon atoms.

In the sulfonation reaction the inert gas: $SO_3$ mole (volume) ratio is generally in the range of 5:1 to 100:1, preferably at least about 10:1, e.g., 50:1 to 20:1.

Among the inert gases which may be used for dilution of the sulfur trioxide are air and nitrogen, which are preferred, carbon dioxide, sulfur dioxide, low molecular weight paraffinic hydrocarbons, etc. The gaseous sulfur trioxide may be provided by vaporizing a stabilized liquid sulfur trioxide or by using converter gas obtained from a sulfur burner.

In carrying out the initial $SO_3$-olefin reaction, it is advantageous to maintain intimate contact between a supply of gaseous $SO_3$ and the olefin. This may be conveniently effected in a continuous manner by exposing to the $SO_3$ one or both faces of a thin flowing film of olefin, as by passing the thin film of olefin down the wall of a tube into the inner portion of which the $SO_3$ is injected.

During the initial $SO_3$-olefin reaction the temperature is advantageously maintained below 60° C., a temperature of less than about 50° C. and, when feasible, not above about 40° C. (e.g., within the range of about 10–40° C.) being preferred. It is usually desirable to work at a temperature at which the sulfonated material produced by the reaction remains in liquid condition. In general, it is desirable to use as low a temperature as possible, e.g., a temperature which is 5° C., or less, above the temperature at which freezing or precipitation takes place. Since the reaction between the $SO_3$ and the olefin is exothermic, it is advantageous to use suitable cooling means; thus, cooling may be effected by passing a cooling medium, such as water, through a jacket surrounding the tubular reactor in which the $SO_3$-olefin reaction takes place.

A "Stage I acid mix" (that is, an acid mix which has not been treated with the strong $H_2SO_4$) may contain, for example, about 35 mole percent anionically active material (based on moles of olefin and measured by titrating the acid mix with a standard cetyl trimethylammonium bromide solution). The Stage I and Stage II acid mixes are usually dark brown viscous materials whose appearance is like that of a melted chocolate bar.

In making the Stage II acid mix the sulfuric acid may be supplied as a separate stream, being added as an aqueous solution (e.g., a 60% sulfuric acid solution) or as 100% sulfuric acid or as oleum (e.g., 65% oleum). 20% oleum has given excellent results, as has sulfuric acid supplied as a 90% or 97% solution; the latter are preferred over the oleum because of economy in use and material and production of lighter colored products. The optimum quantity of sulfuric acid incorporated in this stage of the process is dependent on the reaction conditions in this stage and in the initial stage. Generally, the amount of added sulfuric acid will be in the range of about 2 to 300 parts by weight per 100 parts of Stage I acid mix. For Stage I acid mixes made with 0.8–1.2 moles of $SO_3$ per mole of olefin, the amount of added sulfuric acid is preferably in the range of 2 to 100, e.g., 2 to 50, parts by weight per 100 parts by weight of Stage I mix. Even when a 60% $H_2SO_4$ aqueous solution is employed, the amount of water supplied in the added acid is small, e.g., less than 10% of the weight of the Stage I mix; in the preferred process it is less than 5%, usually less than 3%. Thus, the sulfuric acid treatment takes place under substantially nonhydrolyzing conditions, in contrast to treatment in dilute aqueous medium.

The sulfuric acid treatment is preferably effected at a temperature sufficient to keep the mixture in a flowable state. The temperatures may, for example, be in the range of about 10 to 100° C., preferably in the range of about 25 to 60° C. The duration of the sulfuric acid treatment is advantageously relatively short, preferably less than about an hour, best results being obtained with times of less than about 20 minutes, e.g., 5 minutes or less. Good results have been obtained even when the sulfuric acid was injected into the Stage I mix less than one minute before the mixture was brought into contact with an alkaline neutralizing agent (e.g., excess aqueous NaOH); in one run the Stage I mix was blended with the sulfuric acid and heated to about 55° C. during a period of about 13 seconds and then directly neutralized.

The addition of the sulfuric acid may be effected in any suitable apparatus, preferably one in which the ingredients are mixed together thoroughly and quickly. One suitable technique for continuous operation is to feed the Stage I mix and sulfuric acid to a recycle loop. Good results have also been obtained when the sulfuric acid was injected into the Stage I mix while the latter was passing through the sulfonation apparatus; e.g. when a tubular falling film tower was employed, as previously described, with the olefin and diluted $SO_3$ fed to the top of a vertical tube 20 feet high, the sulfuric acid was injected at a point halfway up the tube. Still another method for carrying out the treatment is to feed the sulfuric acid and Stage I mix to a pump at one end of a length of tubing leading, without recycling, to a neutralization zone.

The following example is given to illustrate this invention further.

EXAMPLE

In this example there was used a $C_{16}$–$C_{20}$ olefin feedstock made by anionic polymerization of ethylene and containing 99 volume percent olefins and 1% saturates; by chromatographic analysis its carbon number distribution was 1 weight percent $C_{14}$, 42 weight percent $C_{16}$, 32 weight percent $C_{18}$, 24 weight percent $C_{20}$ and 1 weight percent $C_{22}$; by infrared analysis of the olefins, 93 mol percent had a terminal —$CH=CH_2$ group, ½ mol percent were cis-internal olefins, 6 mol percent were branched chain olefins having a terminal $>C=CH_2$ group attached to two alkyl radicals, and ½ mol percent were branched chain olefins having an internal $>C=CH-$ group attached to three alkyl radical.

The feedstock was fed to the top of a tubular reactor 20 feet high at the rate of 40 lbs./hr. and flowed downward as a thin film on the internal wall of the reactor while a gaseous mixture of $SO_3$ and air containing 5% $SO_3$ by volume was injected into the top of the reactor, at the rate of 14.6 lbs./hr. of $SO_3$. The reactor temperature was about 110° F. Into the mixture leaving the reactor a stream of concentrated (97%) sulfuric acid was injected continuously at the rate of 5 lbs./hr. The resulting Stage II acid mix was fed into a recycle loop maintained at 110° F. 80 lbs./hr. of aqueous 18% NaOH was also injected into the loop. The recycling speed in the loop and length of the loop were such that the average residence time of the material in the loop was 20 minutes. The slurry in the loop, which (because of the large volume of recycled material) was of substantially uniform composition throughout the loop, had a viscosity of about 5,000 centipoises (Brookfield viscosimeter, spindle No. 3, speed No. 10 at 100° F.) and a water content of 45–50%); its organic "solids" content was about one half water-soluble sodium alkenyl sulfonate and about one half water-insoluble sultone. The slurry was fed to a plate-and-frame heat exchanger whose plates were heated with steam at a pressure of 120 p.s.i.g. and a temperature of 350° F.; the capacity of the heat-exchanger for the mixture being heated was 1½ gallons and the average residence time therein was about 3 minutes. Just before the mixture emerged from the heat exchanger it had a temperature of 330° F.; on emerging into the atmosphere some water (7.3% of the total feed) flashed off and the temperature dropped to 220° F. The product had a viscosity of only 950 centipoises (measured as above, but at 82° F.) and its content of anionically active material was 43%. It contained 1.8% of "free oil" and 1.7% of "glycol-distillable free oil" indicating that practically all the free oil was unsulfonated hydrocarbon; "free oil" is material obtained by pentane extraction from an aqueous ethanol solution of the product, while "glycol-distillable free oil" is determined by an analysis conducted on another sample of the product substantially in the manner described in the Journal of the American Oil Chemists' Society, vol. 40 (1963), pp. 257–260.

While the invention has been illustrated with sodium hydroxide as the base, it will be understood that it is within the broader scope of the invention to employ other alkali metal hydroxides, such as potassium hydroxide, or other alkaline neutralizing agents, alone or in combination with the sodium hydroxide.

Although the present invention has been described with reference to particular embodiments and examples, it will be apparent to those skilled in the art that variations and modifications can be substituted therefor without departing from the principles and true spirit of the invention.

What is claimed is:

1. In the production of olefin sulfonates by the reaction of $SO_3$ and an olefin to produce an acid mix followed by aqueous alkaline treatment to convert the acid mix to an olefin sulfonate, the improvement which comprises first neutralizing the acid mix with aqueous sodium hydroxide while maintaining the temperature below about 150° F., the amount of sodium hydroxide and water being such that the resulting blend has a pH of at least about 12 and has a viscosity of about 5,000 to 30,000 centipoises, and passing the viscous alkaline blend continuously into a zone maintained under superatmospheric pressure in which said blend makes contact with a heated solid heat-exchange surface maintained at a temperature of at least about 350° F. so as to raise the temperature of the blend to at least about 330° F., by said contact, within a period of less than 5 minutes.

2. Process as in claim 1 in which the olefin is an alpha-olefin of 8 to 30 carbon atoms.

3. Process as in claim 1 in which the olefin is an alpha-olefin of about 12 to 21 carbon atoms.

4. Process as in claim 3 in which the aqueous alkaline material is aqueous sodium hydroxide solution in amount of about 110–140% of the amount stoichiometrically required for neutralizing all the acidity of the acid mix and all the acidity obtainable on complete ring opening of the sultone content of the acid mix.

5. Process as in claim 3 in which the acid mix is produced by treating an $SO_3$-olefin reaction product with strong sulfuric acid.

6. Process as in claim 5 in which the aqueous alkaline material is aqueous sodium hydroxide solution in amount of about 120–140% of the amount stoichiometrically required for neutralizing all the acidity of the acid mix and all the acidity obtainable on complete ring opening of the sultone content of the acid mix, and the water content of said blend is below 55%.

7. Process as in claim 6 in which said viscous alkaline blend on neutralization is at a temperature of 90 to 120° F. and has a solids content of about 45 to 55%, said heat-exchange surface is at a temperature in the range of about 350 to 500° F. and the temperature of blend is raised to a value within the range of about 330 to 480° F.

References Cited

FOREIGN PATENTS 1,215,695   5/1966   Germany.

DANIEL D. HORWITZ, *Primary Examiner.*